United States Patent
Kim et al.

(10) Patent No.: US 8,677,012 B2
(45) Date of Patent: Mar. 18, 2014

(54) METHOD OF AND APPARATUS FOR TRANSCEIVING DATA FRAME IN WIRELESS BROADBAND INTERNET NETWORK

(75) Inventors: Chee Ha Kim, Yongin-si (KR); Hee-Jin Jang, Yongin-si (KR); Byoung-Joon Lee, Seongnam-si (KR); Jong Ho Bang, Suwon-si (KR); Su Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 11/819,594

(22) Filed: Jun. 28, 2007

(65) Prior Publication Data

US 2008/0082682 A1 Apr. 3, 2008

(30) Foreign Application Priority Data

Sep. 29, 2006 (KR) .................. 10-2006-0096312

(51) Int. Cl.
*G06F 15/16* (2006.01)
*G06F 15/173* (2006.01)

(52) U.S. Cl.
USPC ..................... 709/236; 709/224; 709/231

(58) Field of Classification Search
USPC ......... 370/341, 342, 349, 352, 419, 356, 392; 455/428, 438, 503; 709/245
See application file for complete search history.

(56) References Cited

U.S. PATENT DOCUMENTS

| | | | |
|---|---|---|---|
| 6,501,957 B2 * | 12/2002 | Muhonen et al. ............. | 455/503 |
| 6,587,457 B1 * | 7/2003 | Mikkonen .................... | 370/356 |
| 7,289,504 B1 * | 10/2007 | Hippelainen et al. ......... | 370/392 |
| 7,623,864 B2 * | 11/2009 | Kang et al. .................... | 455/438 |
| 7,860,067 B2 * | 12/2010 | Na et al. ........................ | 709/245 |
| 2006/0171406 A1 * | 8/2006 | Kwon et al. ................... | 370/419 |
| 2007/0072604 A1 * | 3/2007 | Wang ............................. | 455/428 |
| 2007/0086434 A1 * | 4/2007 | Venkatachalam et al. .... | 370/352 |
| 2007/0097945 A1 * | 5/2007 | Wang et al. ................... | 370/349 |
| 2008/0008159 A1 * | 1/2008 | Bourlas et al. ................ | 370/352 |
| 2008/0025280 A1 * | 1/2008 | Hsu et al. ...................... | 370/341 |
| 2008/0056219 A1 * | 3/2008 | Venkatachalam ............. | 370/342 |

FOREIGN PATENT DOCUMENTS

| | | |
|---|---|---|
| JP | 2004-512787 | 4/2004 |
| KR | 10-2005-0001957 | 1/2005 |
| KR | 10-2006-0040805 | 5/2006 |
| KR | 10-2006-0078667 | 7/2006 |

OTHER PUBLICATIONS

Korean Office Action issued Jun. 20, 2012 in counterpart Korean Patent Application No. 10-2006-0096312 (4 pages, in Korean).

* cited by examiner

*Primary Examiner* — Quang N Nguyen
(74) *Attorney, Agent, or Firm* — NSIP Law

(57) ABSTRACT

A method of transmitting/receiving a frame between a portable terminal and a base station in a wireless broadband Internet network are provided. More particularly, a method of transmitting/receiving frames can include activating a session between the portable terminal and the base station, removing at least one header information field included in an Internet protocol (IP) datagram after activating the session, adding a network header which sets a predetermined transport connection identifier (TCID) to the IP datagram, generating the frame, and transmitting the generated frame via the activated session. Preferably, the frame is generated in any one of the portable terminal and the base station, and transmitted to the other one of the portable terminal and the base station.

23 Claims, 6 Drawing Sheets

METHOD OF AND APPARATUS FOR TRANSCEIVING DATA FRAME IN WIRELESS BROADBAND INTERNET NETWORK

CROSS-REFERENCE TO RELATED APPLICATION

This application claims the benefit under 35 U.S.C. §119(a) of a Korean Patent Application No. 10-2006-0096312, filed on Sep. 29, 2006, in the Korean Intellectual Property Office, the entire disclosure of which is hereby incorporated by reference.

BACKGROUND OF THE INVENTION

1. Field of the Invention

The present invention relates to a wireless broadband Internet (WiBro) system. More particularly, the present invention provides for a method of and apparatus for transceiving a frame in a WiBro system which may reduce overhead and improve data transmission efficiency.

2. Description of Related Art

Fourth generation mobile communication unifies protocols such as Institute of Electrical and Electronics Engineers (IEEE) 802.11, wireless local area network (WLAN), IEEE 802.16d/e, WiBro, and World Interoperability for Microwave Access (WiMAX), etc. In a fourth generation mobile communication system, satellite networks, wireless networks, digital broadcasting networks, and video broadcasting networks are unified into a single network, and systematically interoperate with each other. Accordingly, a user may utilize a communication service such as a portable Internet service in an optimal state, with any network.

WiBro provides a high data rate-wireless Internet access with a personal subscriber station (PSS) under a stationary and mobile environment, anytime and anywhere. Users may connect to the Internet in a moving car or subway by using a WiBro terminal which is installed in portable devices such as a notebook personal computer (PC), a personal digital assistant (PDA), a vehicle-based receiver, and the like.

WiBro service is currently positioned between a mobile phone and WLAN in terms of transmission speed, mobility, service coverage, and the like. Users may continuously use high-speed Internet service by complementing mobility in WLAN. For an infrastructure to provide WiBro service, investment costs are preferably lower than mobile phone wireless Internet costs, while allowing higher transmission speeds in the Wibro service. Accordingly, the WiBro service may provide high-quality wireless Internet access service with lower costs.

However, in WiBro networks according to related art, research to reduce overhead of a wireless section in a network (e.g., a portable subscriber station in wireless communication with a radio access station) and improve data transmission efficiency is being conducted due to the size of a header in a frame being relatively large in proportion to the size of the actual frame being transmitted/received between a transmitter and receiver.

SUMMARY OF THE INVENTION

Exemplary embodiments of the present invention address at least the above problems and/or disadvantages and provide at least the advantages described below. Accordingly, an aspect of exemplary embodiments of the present invention is to provide a method of and apparatus for transceiving a frame in a WiBro system which share header information, where frames are repeatedly transmitted between a transmitter and receiver, the shared header information is removed from the frame to be transmitted, a transport connection identifier (TCID) is inserted into the frame, and the frame having an inserted TCID is transmitted to efficiently reduce overhead in a wireless section and improve data transmission efficiency.

According to an aspect of exemplary embodiments of the present invention, a method of transmitting a frame between a portable terminal and a base station in a wireless broadband Internet network is provided, the method comprising activating a session between the portable terminal and the base station, removing at least one header information field included in an Internet protocol (IP) datagram, adding a network header which sets a predetermined TCID to the IP datagram after activating the session, generating the frame, and transmitting the generated frame via the activated session. The frame may be generated in any one of the portable terminals and base stations, and transmitted to the other one of the portable terminals and base stations.

According to an aspect of exemplary embodiments of the present invention, an apparatus for transmitting a frame in a wireless broadband Internet network is provided, the apparatus comprising a header information removing unit for removing at least one header information field included in a generated IP datagram, a TCID storing unit for storing a plurality of TCIDs and at least one header information field corresponding to the plurality of TCIDs, and a frame generation unit for setting a network header by using a TCID from the TCID storing unit corresponding to an IP datagram where the at least one header information field is removed, adding the set network header to the IP datagram, and generating the frame. Also, the frame is generated in any one of the portable terminals and base stations, and transmitted to the other one of the portable terminals and base stations.

According to another aspect of exemplary embodiments of the present invention, a method of receiving a frame between a portable terminal and a base station in a wireless broadband Internet network is provided, the method comprising activating a session between the portable terminal and the base station, receiving the frame via the activated session, and detecting a TCID included in a network header of the received frame, after activating the session, confirming whether a stored TCID matches the detected TCID, and adding the at least one header information field corresponding to the stored TCID to an IP datagram when the stored TCID matches the detected TCID. Also, the frame is generated in any one of the portable terminal and the base station, and transmitted to the other one of the portable terminal and the base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The portable terminal, which supports a wireless broadband Internet (WiBro) service according to an exemplary embodiment of the present invention, may be embodied as any one of a mobile communication terminal, a public switched telephone network (PSTN) terminal, a voice over Internet Protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (hand-held PC), a code-division multiple access (CDMA)-2000 (1X, 3X) phone, a wideband code-division multiple access (wideband CDMA) phone, a dual band/dual mode phone, a Global System for Mobile Communication (GSM) phone, a mobile broadband system (MBS) phone, or a satellite/terrestrial digital multimedia broadcasting (DMB) phone, and the like.

Figure 1:
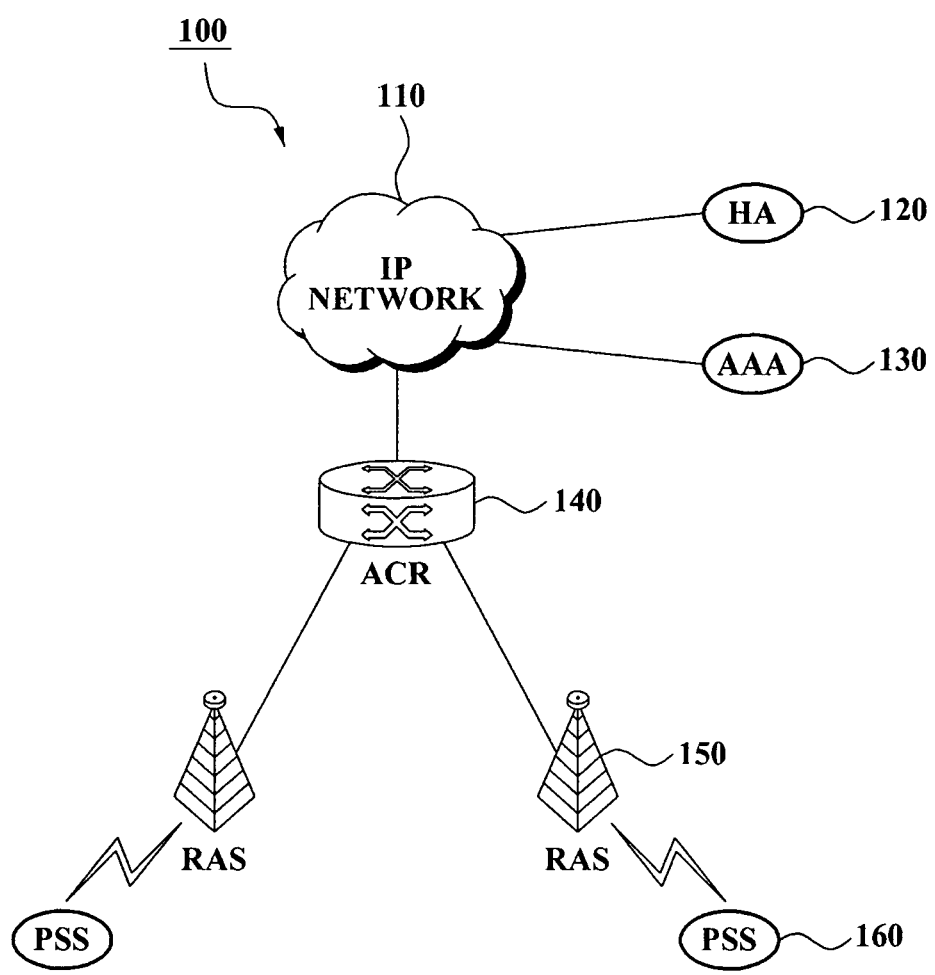
FIG. 1 is a diagram illustrating a wireless broadband Internet (WiBro) network according to an exemplary embodiment of the present invention.

FIG. 1 is a diagram illustrating a WiBro network according to an exemplary embodiment of the present invention.

As illustrated in FIG. 1, the WiBro network 100 according to an exemplary embodiment of the present invention includes an Internet Protocol (IP) network 110, a Home Agent (HA) 120, an Authentication, Authorization, Accounting (AAA) server 130, an Access Control Router (ACR) 140, a Radio Access Station (RAS) 150, and a Portable Subscriber Station (PSS) 160.

In a wireless section between the RAS 150 and the PSS 160, the RAS 150 is a base station of the WiBro network, and wirelessly transmits data to the PSS 160. In this instance, the data is received from the ACR 140. The PSS 160 is a portable terminal of the WiBro network, and may be provided with high-speed Internet service by using the data which is received from the RAS 150.

Figure 2:
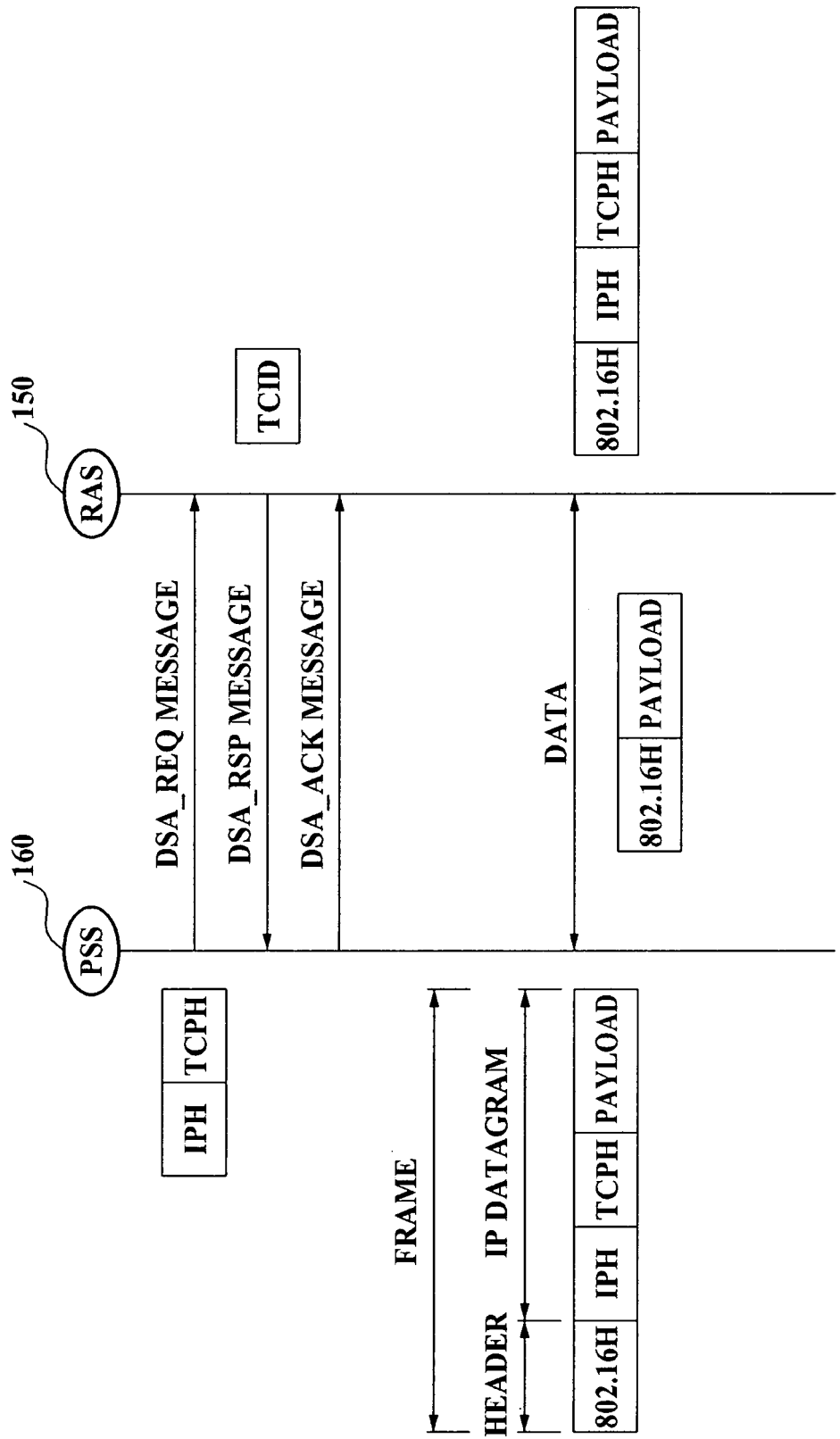
FIG. 2 is a flowchart illustrating an example of an operational principle of transceiving a frame according to an exemplary embodiment of the present invention.

FIG. 2 is a flowchart illustrating an example of transceiving a frame according to an exemplary embodiment of the present invention.

As illustrated in FIG. 2, in order to transmit/receive a frame between a portable terminal and a base station in a WiBro network according to an exemplary embodiment of the present invention, a session between the PSS 160 and the RAS 150 may be activated by transmitting/receiving a dynamic service addition_request (DSA_REQ) message, a dynamic service addition_response (DSA_RSP) message, and a dynamic service addition_acknowledge (DSA_ACK) message. The DSA_REQ message includes at least one header information field, and the DSA_RSP message includes a predetermined transport connection identifier (TCID).

Through this, while activating the session between the PSS 160 and the RAS 150, the at least one header information field and the predetermined TCID may be shared. In this instance, the at least one header information field is included in an IP datagram, and the predetermined TCID is included in a network header of the frame.

After the session is activated, the PSS 160 removes the shared at least one header information field in the IP datagram and adds a network header, which sets the TCID. The TCID may be of an IEEE 802.16H standard, and is preferably used for generating a frame. Accordingly, the PSS 160 may transmit the generated frame to the RAS 150. In this instance, the IP datagram includes a transmission control protocol header (TCPH), an IP header (IPH), and a payload. Also, the frame may be generated based on a frame format defined by an IEEE 802.16 standard.

The header information field may include at least one of TCP header information field and IP header information field. Also, the header information field is not changed until a session for transmitting the frame is disabled. As an example, the unchanged header information field may include a source IP address, a destination IP address, a source port number, a destination port number, and the like. Also, the TCID is an index for distinguishing the at least one header information field which is shared via the activated session.

Hereinafter, methods of and apparatuses for transmitting/receiving a frame in a WiBro system according to an exemplary embodiment of the present invention are described in more detail with reference to FIGS. 3, 4, 5, and 6.

In this instance, the frame may be generated in any one of the portable terminals and base stations, and transmitted to the other one of the portable terminals and base stations. Particularly, the PSS 160 which generates the frame, transmits the generated frame to the RAS 150, and receives another generated frame from the RAS 150, is described as an example.

Figure 3:
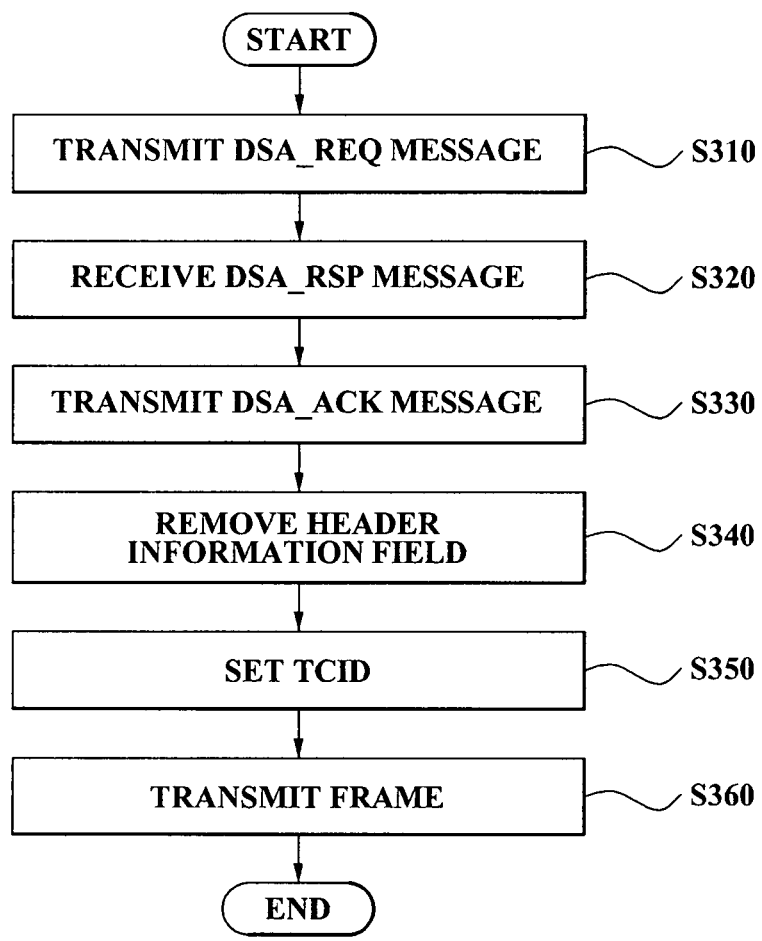
FIG. 3 is a flowchart illustrating a method of transmitting a frame according to an exemplary embodiment of the present invention.

FIG. 3 is a flowchart illustrating a method of transmitting a frame according to an exemplary embodiment of the present invention.

As illustrated in FIG. 3, in operation S310, a DSA_REQ message is transmitted. In operation S320, a DSA_RSP message is received. In operation S330, a DSA_ACK message is transmitted. In operation S340, header information field is removed. In operation S350, a TCID is set. In operation S360, a frame is transmitted.

Specifically, in operation S310, when activating a session between the PSS 160 and the RAS 150, the PSS 160 transmits the DSA_REQ message including at least one header information field to the RAS 150.

In operation S320, the PSS 160 receives the DSA_RSP message including a predetermined TCID, in response to the DSA_REQ message. In operation S330, the PSS 160 transmits the DSA_ACK message to the RAS 150. Accordingly, the session may be activated.

The PSS 160 and the RAS 150 may share the at least one header information field and the predetermined TCID. In this instance, the at least one header information field is preferably included in an IP datagram, and the predetermined TCID is preferably included in a network header of the frame.

The PSS 160 may generate and transmit the frame based on the shared at least one header information field and the predetermined TCID, which is described in detail with reference to FIG. 4.

Figure 4:
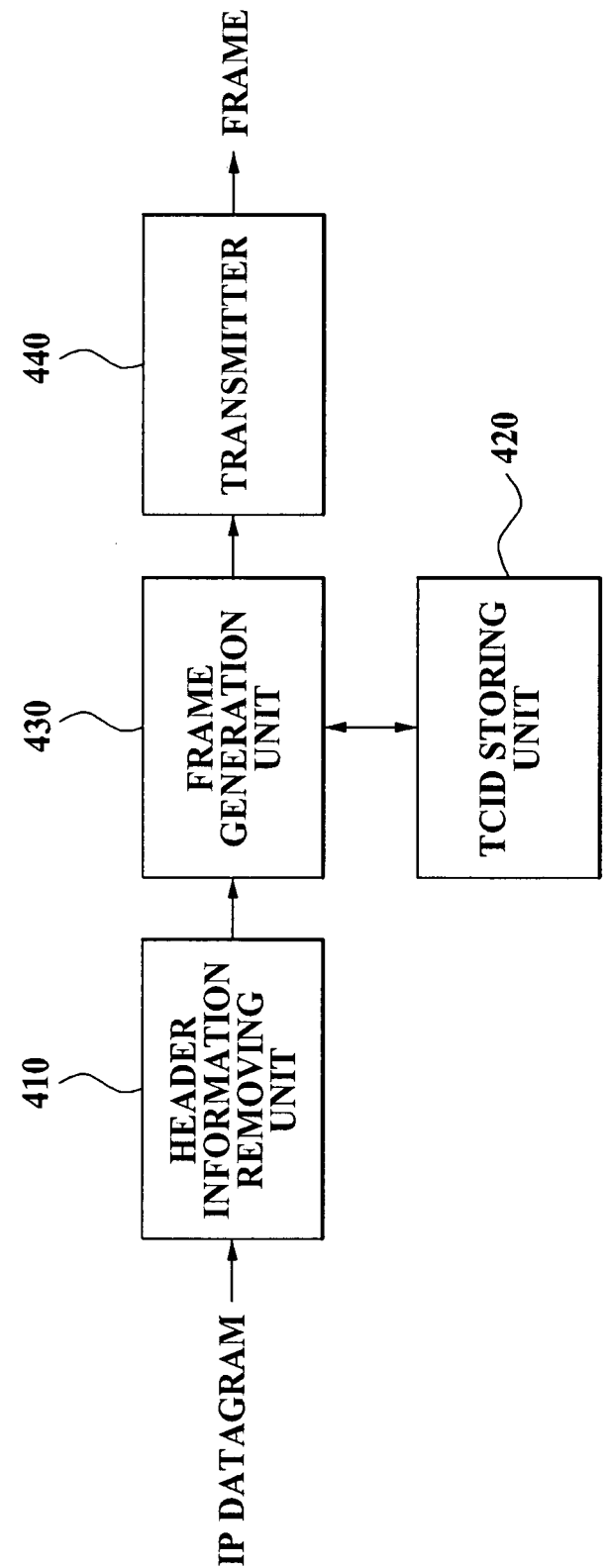
FIG. 4 is a diagram illustrating an apparatus for transmitting a frame according to an exemplary embodiment of the present invention.

FIG. 4 is a diagram illustrating an apparatus for transmitting a frame according to an exemplary embodiment of the present invention.

As illustrated in FIG. 4, the apparatus for transmitting a frame according to an exemplary embodiment of the present invention includes a header information removing unit 410, a TCID storing unit 420, a frame generation unit 430, and a transmitter 440.

The header information removing unit 410 removes the shared at least one header information field in an IP datagram in operation S340. In this instance, the IP datagram is generated based on information to be transmitted. The frame generation unit 430 may add a network header which is set by using a TCID, to the IP datagram, and thereby may generate a frame in operation S350. In this instance, the TCID is stored in the TCID storing unit 420. The TCID storing unit 420 may store a plurality of TCIDs and the at least one header information field corresponding to the plurality of TCIDs.

The PSS 160 may transmit the generated frame to the RAS 150 via the transmitter 440, in operation S360. In this instance, the TCID which is set in the network header of the frame is an index for distinguishing the at least one header information field which is shared via the activated session. Also, in the activated session, the session is activated by the PSS 160. As an example, when activating a plurality of sessions between the PSS 160 and the RAS 150, the plurality of TCIDs may be shared to distinguish the at least one header information field which is shared via each of the plurality of sessions.

Figure 5:
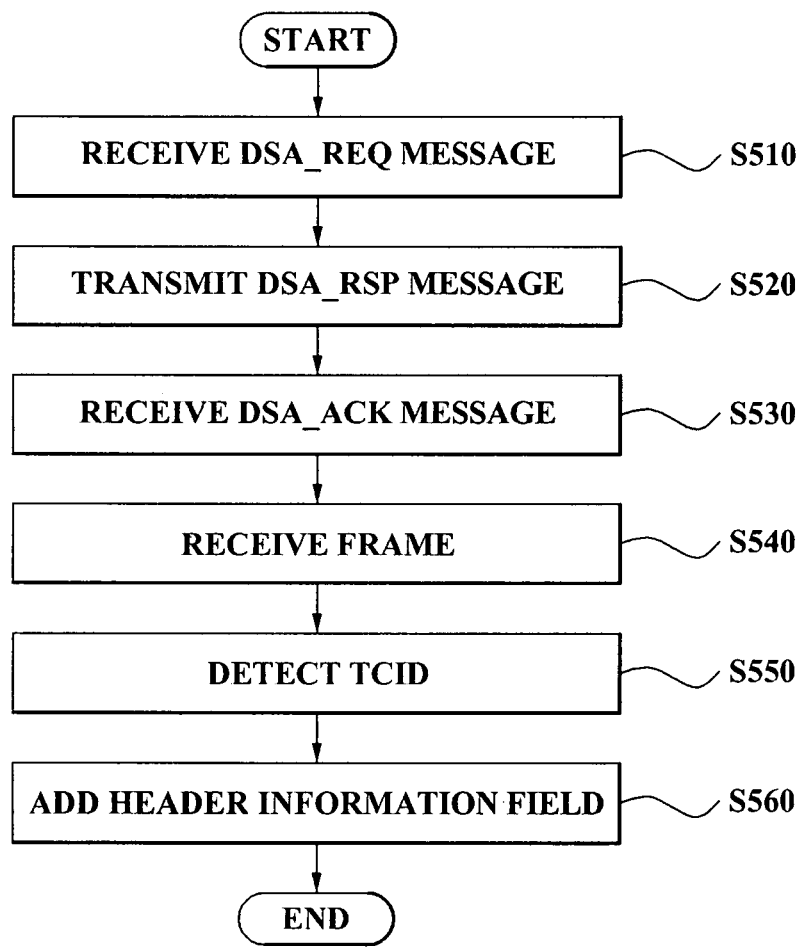
FIG. 5 is a flowchart illustrating a method of receiving a frame according to an exemplary embodiment of the present invention.

FIG. 5 is a flowchart illustrating a method of receiving a frame according to an exemplary embodiment of the present invention.

As illustrated in FIG. 5, in operation S510, a DSA_REQ message is received. In operation S520, a DSA_RSP message is transmitted. In operation S530, a DSA_ACK message is received. In operation S540, a frame is received. In operation S550, a TCID is detected. In operation S560, header information field is added.

Specifically, when activating a session between the PSS 160 and the RAS 150, the PSS 160 receives the DSA_REQ message including at least one header information field from the RAS 150, in operation S510.

The PSS 160 transmits the DSA_RSP message including a predetermined TCID in response to the DSA_REQ message in operation S520. The PSS 160 then receives the DSA_ACK message from the RAS 150 in operation S530. Accordingly, the session may be activated.

The PSS 160 may generate and transmit the frame based on the shared at least one header information field and the predetermined TCID, which is described in detail with reference to FIG. 6.

Figure 6:
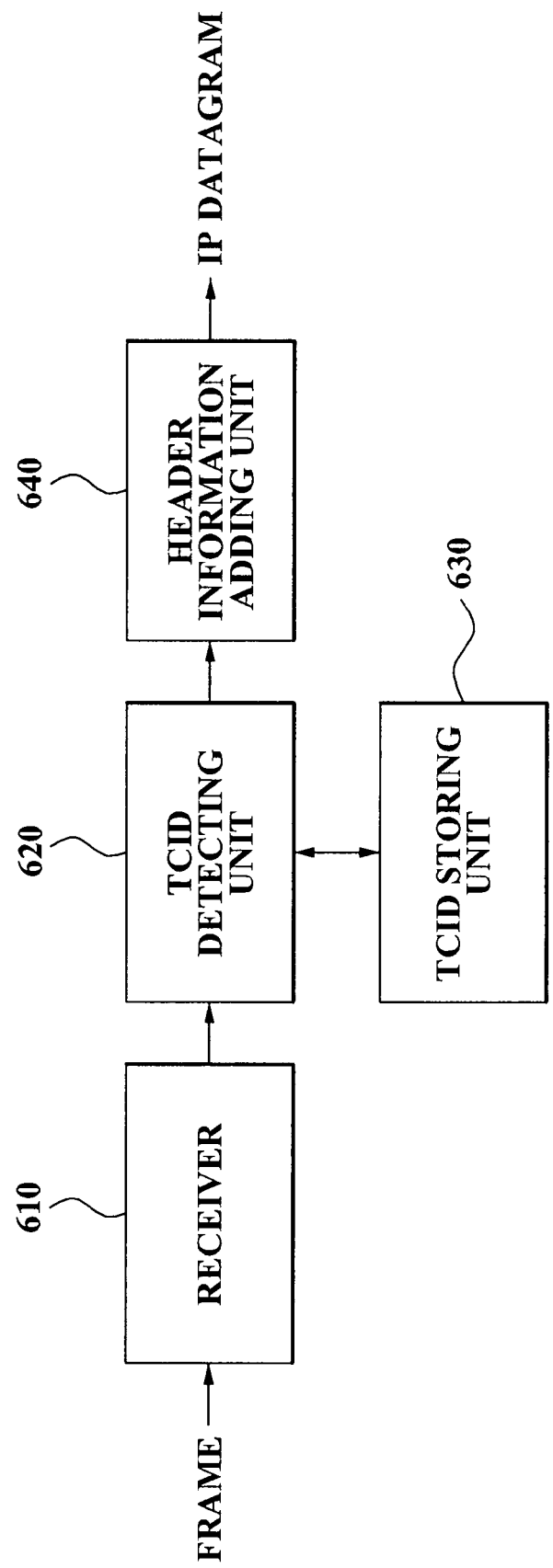
FIG. 6 is a diagram illustrating an apparatus for receiving a frame according to an exemplary embodiment of the present invention.

FIG. 6 is a diagram illustrating an apparatus for receiving a frame according to an exemplary embodiment of the present invention.

As illustrated in FIG. 6, the apparatus for receiving a frame according to an exemplary embodiment of the present invention includes a receiver 610, a TCID detecting unit 620, a TCID storing unit 630, and a header information adding unit 640.

The TCID detecting unit 620 receives a frame via the receiver 610 in operation S540. Also, the TCID detecting unit 620 detects a TCID included in a network header of a received frame in operation S550. The header information adding unit 640 may detect a TCID from a frame which is identical to a stored TCID which has at least one header information field corresponding to the stored TCID. In this instance, a plurality of TCIDs are stored in the TCID storing unit 630.

In operation S560, the header information adding unit 640 adds the at least one header information field corresponding to the detected TCID to an IP datagram. Accordingly, the PSS 160 may restore the IP datagram to be transmitted to the RAS 150.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include, but are not limited to, magnetic media such as hard disks, floppy disks, and magnetic tape; optical media such as CD ROM disks and DVD; magneto-optical media such as optical disks; hardware devices that are specially configured to store and perform program instructions, such as read-only memory (ROM), random access memory (RAM), and flash memory and the like. The computer-readable recording media can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains. A transmission medium may also be employed, such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an aspect of exemplary embodiments of the present invention, a method of and apparatus for transceiving a frame in a WiBro system sharing the header information field, where frames are repeatedly transmitted between a transmitter and receiver, the shared header information is removed from the frame, a TCID is inserted into the frame, and a frame having an inserted TCID is transmitted, and thereby may efficiently reduce overhead in a wireless section.

Also, according to an aspect of exemplary embodiments of the present invention, a method of and apparatus for transceiving a frame in a WiBro system sharing the header information field, where frames are repeatedly transmitted between a transmitter and receiver, the shared header information field is removed from the frame, a TCID is inserted into the frame, and a frame having an inserted TCID is transmitted, and thereby may improve data transmission efficiency.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of transmitting a frame from a portable terminal to a base station in a wireless broadband Internet network, the method comprising:

transmitting, to the base station, a message comprising at least one header information field included in an Internet protocol (IP) datagram and requiring a predetermined transport connection identifier (TCID), during an activation session with the base station;

receiving, from the base station, the predetermined TCID included in a network header of a frame in response to the message, during the activation session with the base station;

removing, at the portable terminal, the at least one header information field included in an Internet protocol (IP) datagram, after activating the session;

adding, at the portable terminal, a network header that sets the predetermined TCID to the IP datagram based on the predetermined TCID received from the base station, and generating the frame; and transmitting the generated frame via the activation session to the base station;

wherein the predetermined TCID is an index configured to distinguish the at least one header information field which is shared via the activation session.

2. The method of claim 1, wherein the wireless broadband Internet network is a WiBro network.

3. The method of claim 1, wherein the header information field comprises at least one of a transmission control protocol (TCP) header information field and an IP header information field.

4. The method of claim 1, wherein the header information field is unchanged until a session for transmitting the frame is disabled.

5. The method of claim 1, wherein the activating comprises:

transmitting a dynamic service addition_request (DSA_REQ) message including the at least one header information field;

receiving a dynamic service addition_response (DSA_RSP) message including the predetermined TCID, in response to the DSA_REQ message; and transmitting a dynamic service addition_acknowledge (DSA_ACK) message, after receiving the DSA_RSP message.

6. The method of claim 5, wherein the DSA_RSP message comprises the predetermined transport connection identifier (TCID).

7. The method of claim 1, wherein the frame is generated based on a frame format defined by an Institute of Electrical and Electronics Engineers (IEEE) 802.16 standard.

8. The method of claim 1, further comprising restoring the IP datagram to be transmitted to the base station.

9. A non-transitory computer-readable recording medium storing a program for implementing a method of transmitting a frame from a portable terminal to a base station in a wireless broadband Internet network, the method comprising:

transmitting, to the base station, a message comprising at least one header information field included in an Internet protocol (IP) datagram and requiring a predetermined transport connection identifier (TCID), during an activation session with the base station;

receiving, from the base station, the predetermined TCID included in a network header of a frame in response to the message, during the activation session with the base station;

removing, at the portable terminal, the at least one header information field included in an Internet protocol (IP) datagram, after activating the session;

adding, at the portable terminal, a network header that sets the predetermined TCID to the IP datagram based on the predetermined TCID received from the base station, and generating the frame; and transmitting the generated frame via the activation session to the base station;

wherein the predetermined TCID is an index configured to distinguish the at least one header information field which is shared via the activation session.

10. A portable terminal for transmitting a frame from the portable terminal to a base station in a wireless broadband Internet network, the portable terminal comprising:

a processor;

a transceiver configured to transmit, to the base station, a message comprising at least one header information field included in an Internet protocol (IP) datagram and requiring a predetermined transport connection identifier (TCID), during an activation session with the base station, and configured to receive, from the base station, the predetermined TCID included in a network header of a frame in response to the message, during the activation session with the base station;

a header information removing unit configured to remove the at least one header information field included in a generated Internet protocol (IP) datagram;

a TCID storing unit configured to store a plurality of TCIDs and at least one header information field corresponding to the plurality of TCIDs; and a frame generation unit configured to set a network header by using the predetermined TCID received from the base station corresponding to an IP datagram in which the at least one header information field is removed from the IP datagram, add the corresponding network header to the IP datagram, and generate the frame;

wherein the predetermined TCID is an index configured to distinguish the at least one header information field which is shared via the activation session.

11. The portable terminal of claim 10, wherein the wireless broadband Internet network is a WiBro network.

12. The portable terminal of claim 10, wherein the header information field comprises at least one of TCP header information field and IP header information field.

13. The portable terminal of claim 10, wherein the portable terminal is any one of a mobile communication terminal, a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, and a satellite/terrestrial Digital Multimedia Broadcasting (DMB) phone.

14. A method of a portable terminal receiving a frame from a base station in a wireless broadband Internet network, the method comprising:

receiving, from the base station, a message comprising at least one header information field included in an Internet protocol (IP) datagram and requiring a predetermined transport connection identifier (TCID), during an activation session with the base station;
transmitting, to the base station, the predetermined TCID included in a network header of a frame in response to the message during the activation session with the base station;
receiving the frame via the activation session, at the portable terminal, and detecting a TCID included in a network header of the received frame, after activating the session;
confirming, at the portable terminal, whether the transmitted TCID is identical to the detected TCID; and
adding, at the portable terminal, the at least one header information field corresponding to the detected TCID to an IP datagram, when the transmitted TCID is identical to the detected TCID;
wherein the predetermined TCID is an index configured to distinguish the at least one header information field which is shared via the activation session.

15. The method of claim 14, wherein the wireless broadband Internet network is a WiBro network.

16. The method of claim 14, wherein the header information field comprises at least one of a TCP header information field and an IP header information field.

17. The method of claim 14, wherein the header information field is unchanged until a session for transmitting the frame is disabled.

18. The method of claim 14, wherein the activating comprises:
receiving a DSA_REQ message including the at least one header information field;
transmitting a DSA_RSP message including the TCID, in response to the DSA_REQ message; and
receiving a DSA_ACK message, after receiving the DSA_RSP message.

19. The method of claim 14, wherein the frame is generated based on a frame format defined by the IEEE 802.16 standard.

20. A non-transitory computer-readable recording medium storing a program for implementing a method of a portable terminal receiving a frame from a base station in a wireless broadband Internet network, the method comprising:
receiving, from the base station, a message comprising at least one header information field included in an Internet protocol (IP) datagram and requiring a predetermined transport connection identifier (TCID), during an activation session with the base station;
transmitting, to the base station, the predetermined TCID included in a network header of a frame in response to the message, during the activation session with the base station;
receiving the frame via the activation session, at the portable terminal, and detecting a TCID included in a network header of the received frame, after activating the session;
confirming, at the portable terminal, whether the transmitted TCID is identical to the detected TCID; and
adding, at the portable terminal the at least one header information field corresponding to the detected TCID to an IP datagram, when the transmitted TCID is identical to the detected TCID;
wherein the predetermined TCID is an index configured to distinguish the at least one header information field which is shared via the activation session.

21. A portable terminal for receiving a frame transmitted from a base station in a wireless broadband internet network, the terminal comprising:
a processor;
a receiver configured to receive, from the base station, a message comprising at least one header information field included in an Internet protocol (IP) datagram and requiring a predetermined transport connection identifier (TCID), during an activation session with the base station;
a transmitter configured to transmit, to the base station, the predetermined TCID included in a network header of a frame in response to the message, during the activation session with the base station;
a TCID detecting unit configured to detect a TCID included in a network header of a received frame;
a TCID storing unit configured to store a plurality of TCIDs and at least one header information field corresponding to the plurality of TCIDs; and
a header information adding unit configured to extract at least one header information field corresponding to the detected TCID, from the TCID storing unit, and add the at least one header information field to an IP datagram;
wherein the predetermined TCID is an index configured to distinguish the at least one header information field which is shared via the activation session.

22. The portable terminal of claim 21, wherein the wireless broadband Internet network is a WiBro network.

23. The portable terminal of claim 21, wherein the header information field comprises at least one of a TCP header information field and an IP header information field.

* * * * *